Dec. 24, 1968   I. P. MAIL   3,418,236
FLOTATION METHOD AND APPARATUS
Filed July 18, 1966   2 Sheets—Sheet 1
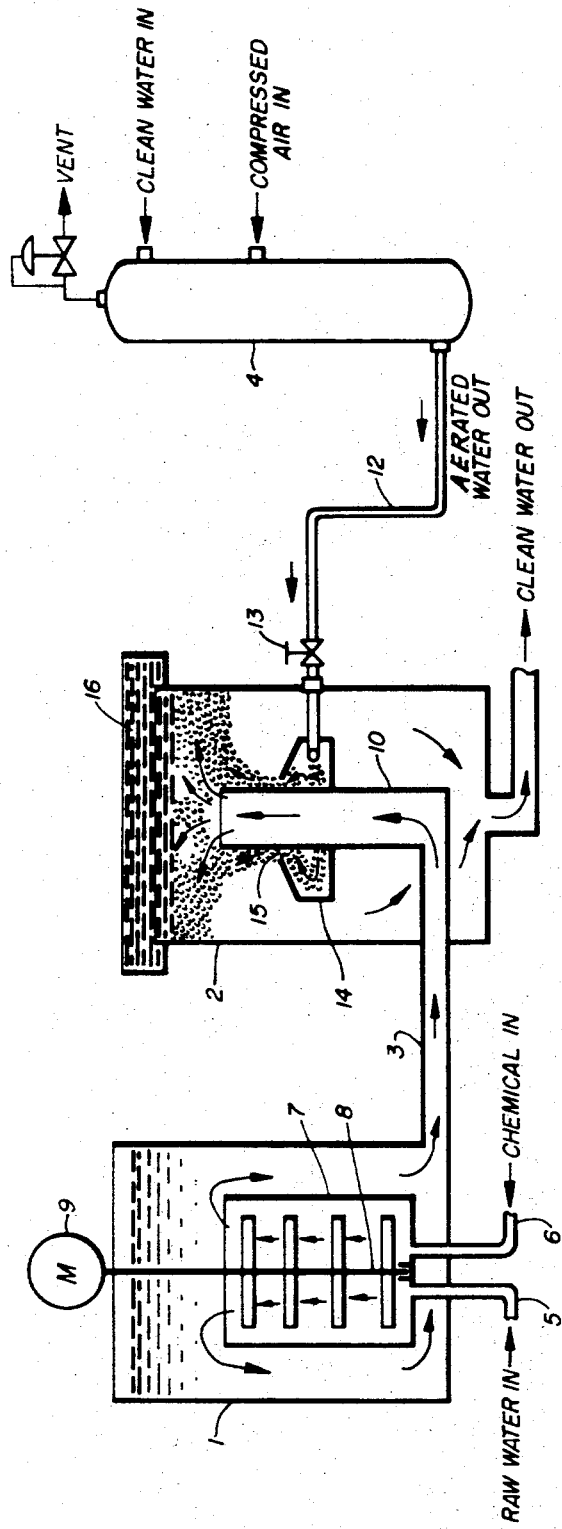
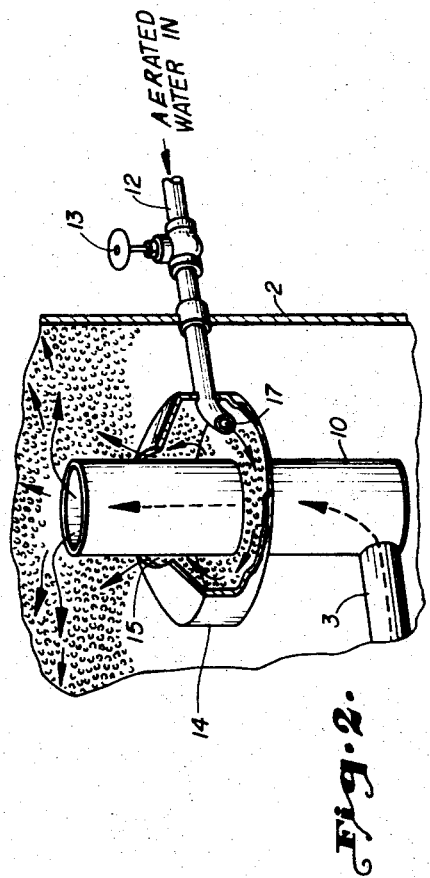
INVENTOR.
ISAAC PAUL MAIL
BY
ATTORNEY

INVENTOR.
ISAAC PAUL MAIL

United States Patent Office 3,418,236
Patented Dec. 24, 1968

3,418,236
FLOTATION METHOD AND APPARATUS
Isaac Paul Mail, Tulsa, Okla., assignor to Combustion Engineering, Inc., New York, N.Y., a corporation of Delaware
Filed July 18, 1966, Ser. No. 565,974
6 Claims. (Cl. 210—44)

ABSTRACT OF THE DISCLOSURE

A tank has a central flame for flowing polluted water into the tank. A source of gas bubbles is arranged to release bubbles into, and under, the polluted water to float the contaminates of the water to the surface.

The present invention is related to the removal of foreign matter from water by forming a floc with a coagulating agent and flotating the floc to the surface of the water with a gaseous medium.

Contamination of water with foreign material presents a widespread industrial problem. Filtration of the contaminates from polluted water has been employed. Various additives have been combined with the contaminates to facilitate removal of the combination by settling.

The present invention is embodied in a method of and apparatus for removing contaminates from water produced with oil. However, the contamination problems associated with this water are similar to the problems of all contaminated industrial water; the invention is not to be limited to the solution of the particular problem disclosed with oil field water.

Where relatively large amounts of water are produced with oil, the disposal of the water is one problem. Residual oil, and other products from the well and treating processes, are mixed with the water. In effect, an oil-in-water emulsion remains, although this mixture is referred to as the "water" of the treating process.

A mixture of oil and water cannot be readily disposed of. If dumped into a river, pollution results. Also, the pits which are otherwise employed are unsightly and often limited in size.

A second problem descends with the use of steam to thermally stimulate oil production. The condensed steam becomes an additional water produced with the oil. Securing sufficient water for steam generation may have limitations. It may be highly desirable to recover some, or substantially all, of the water of the steam.

The more subjective problem centers around the basic decision to flocculate the solid foreign matter of contaminated water and float the floc upward, for separation from the water, with the air precipitated from aerated water. The air must be provided in small bubbles for efficient mixing with the floc. The air must not coalesce into larger bubbles prior to contact with the floc.

It is a principal object of the present invention to provide isolation for depressured aerated water to precipitate air from the water for subsequent mixing with solid material to be separated from a liquid by flotation.

Another object is to mix air precipitated from aerated water with solid material to be separated from a liquid by flotation before the bubbles of precipitated air coalesce a substantial amount into larger bubbles.

The present invention contemplates depressuring aerated water and maintaining the water in isolation from a mixture of solid material and water to precipitate bubbles so small that substantial coalescence of the bubbles will not occur prior to subsequent mixing of the precipitated air with the solid material for flotation separation of the solid material from the water.

Other objects, advantages and features of this invention will become apparent to one skilled in the art upon consideration of the written specification, appended claims, and attached drawings, wherein:

FIG. 1 is a diagrammatic flow diagram of a complete system in which the invention is embodied;

FIG. 2 is a perspective of the isolation chamber of FIG. 1 provided for the depressured, aerated water; and FIG. 3 is a more or less diagrammatic, sectioned elevation of a flotation tank with an arrangement for injecting the depressured, aerated water to provide isolation during bubble formation.

Figure 5:
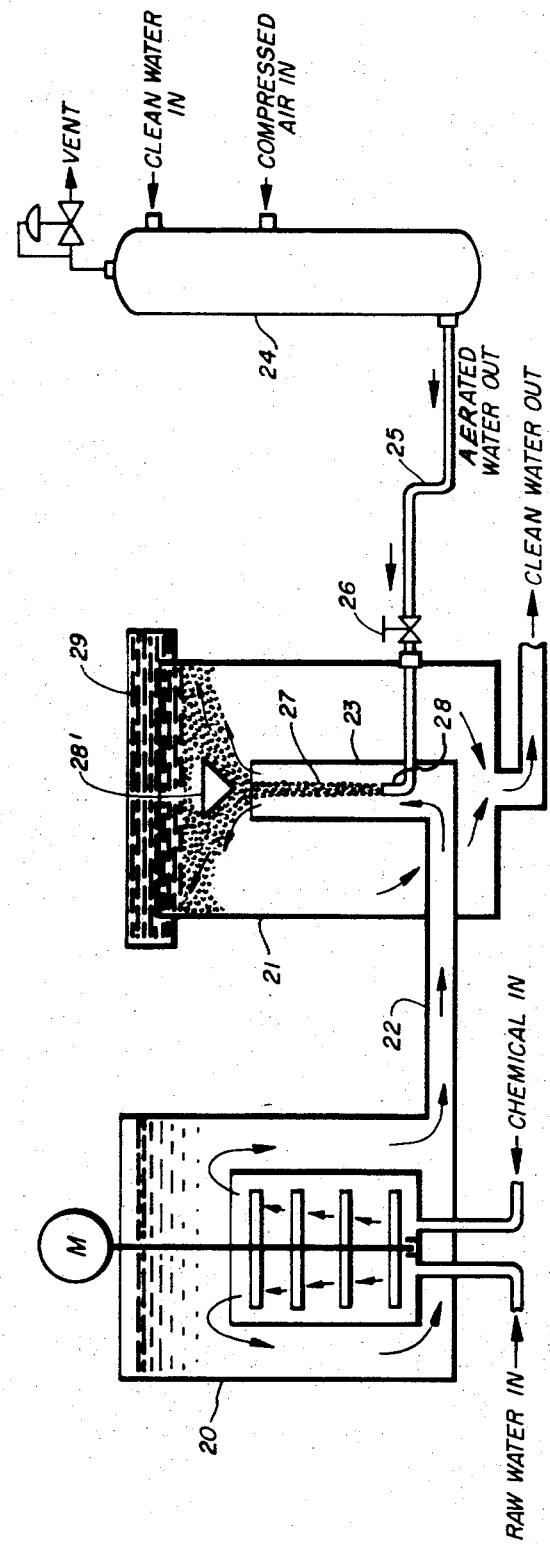

The use of coagulating agents to remove contaminates from water is an old art. Ferric sulfate and aluminum sulfate are common agents. Ferric sulfate is generally employed where the water has a 5 to 10 pH range, or higher; aluminum sulfate is commonly employed when the pH is in a lower range. The sulfates will dissolve in the water and form hydroxides of a gelatinous form which oil and other contaminates will adhere and/or be absorbed.

The difference in density between a floc of hydroxide which is dispersed in water and water itself is slight. Normally, the hydroxide, with the contaminates adhering to and/or absorbed by it, has a density somewhat greater than that of water. If given sufficient residence time, this floc will gravitate to the bottom of any container of the mixture. However, if sufficient gas is distributed in the floc, the resulting mixture will be so much less dense than water that it will quickly float to the surface for ready removal. Subsequent filtration may be desirable to remove additional contaminates, but a high percentage of the contaminates can be removed by this flotation of floc of hydroxide.

Referring to the drawings, FIG. 1 depicts a first tank which embodies the first zone in which the floc is to be formed. Tank 1 is connected to a tank 2 by a conduit 3, tank 2 embodying the second zone in which the floc is floated to the top of the zone for removal.

The gas for flotation of the floc is represented by air, introduced from a tank 4 into tank 2. The air is introduced into the second zone so it will mix with the floc, the mixture floating to the top of tank 2.

There are many critical, specific problems in operating the apparatus to carry out the method. In tank 1 there is the specific problem of mixing the chemicals with the raw water. The raw water inlet 5 and chemical inlet 6 are shown connected into an inner chamber 7 which is mounted in tank 1. A stirring or mixing device is illustrated as a paddle 8, depending into chamber 7. A motor 9 is provided to actuate the paddle 8.

There may be many variations of this structure. Whatever the variations, the object is to bring the raw, contaminated water into intimate contact with a coagulating agent to promote the formation of a floc which will adhere to and/or absorb contaminates from the water.

The floc requires time to form and contact the contaminates of the raw water. After the initial formation and contact, a relatively quiet period should be provided during which floc growth and contact with contaminates are completed. Inner chamber 7 is provided for the mixing to give the initial floc formation and contact. Flow from the top of this mixing volume is downward, through the large volume provided by tank 1 to give at least four to six minutes of residence time for adequate floc growth and contact with the contaminates.

Once the floc is quietly formed with adequate residence time, the mixture of floc and water is transported as smoothly as possible to the second zone for flotation. Contact between the floc and a gaseous medium in the second zone is another problem. This contact is brought about in the second zone with a method and apparatus employing the present invention.

Inner chamber 10 is connected to conduit 3 to receive the floc and water mixture and discharge it over a wide cross-sectional area of the upper portion of tank 2. Air, as the gaseous medium, is released within this second zone so as to mix with the floc and float it upwards. The floc distribution and mixing with air can be carried out with other forms of structure, but they should all carry out the concept of mixing and even horizontal distribution of the mixture to bring about the desired flotation.

Before the mixing and distribution and flotation functions are disclosed, the manipulation of air, as the gaseous flotation medium, will be described. In FIG. 1 tank 4 is provided for aerating water. Air is compressed and passed upward in tank 4 while clean water is passed downward. The water is thereby saturated with the air and flowed from the tank 4 through conduit 12. The various controls for tank 4 are not shown; only a controlled vent is indicated, keeping the tank under a pressure in excess of 40 p.s.i.g. In any event, the disclosure is basically of structure to produce aerated water for use in the second zone in tank 2.

The aerated water is depressed and provided a residence time, in isolation, while its air is precipitated in small bubbles. FIG. 1 discloses a valve 13 across which a pressure drop on the aerated water is developed, and a chamber 14 providing the residence time after the pressure drop. The water, and precipitated air bubbles, flow from chamber 14 through opening 15 to mix with the floc and float it to the top of tank 2 in a body 16 which is readily removed by means not shown in this disclosure.

One of my important observations is that, following the pressure reduction of the aerated water to substantially the pressure of the atmosphere, precipitation of air does not begin for a finite period of time. If the aerated water is injected into the floc and water mixture before this time interval has elapsed, the air will not precipitate in the desired quantity from such mixture. The depressured water must be isolated for this precipitation period and chamber 14 is one means for providing this isolation.

FIG. 2 discloses the chamber 14, conduit 10, conduit 12 and valve 13 to some further advantage. To insure smooth entry of the depressured water into chamber 14, the end of conduit 12, which penetrates the side of chamber 14, is directed, at 17, to give a tangential direction to the water within chamber 14. The residence time of the water in chamber 14 is then at a maximum, at least the minimum time required for precipitation of its air. The resulting bubbles are carried by the water from which they precipitated through opening 15 to mix with the floc discharged from conduit 10.

The arrangement of chamber 10 and chamber 14, in FIGS. 1 and 2 provide horizontal distribution of air bubbles beneath the floc. The bubbles flow from opening 15 and form a zone with a finite vertical height within the second zone of tank 2, beneath the floc discharged from the top of chamber 10. The rising bubbles of air mix with and attach to the floc, carrying it upward for removal from the upper portion of the second zone.

The structure disclosed in FIGS. 1 and 2 implements the concept of isolating aerated water for precipitation of its air; the chamber 14 represents a range of positive, mechanical structures that will carry out the required functions. However, these concepts can be implemented with more simple structural arrangements. FIG. 3 represents a range of such simple structures which will provide the equivalent of the isolation chamber 14.

In FIG. 3 a first zone is provided within tank 20 for flocculation. Tank 21 provides a second zone for flotation. This two-zone concept is the same as that implemented by the structure disclosed in FIG. 1.

Conduit 22 forms a path of fixed dimensions for the mixture of floc and water to flow from the first zone into the vertical conduit 23 mounted in the second zone. In flowing up chamber 23 for discharge into tank 21, the floc and water mixture ascends smoothly, without any substantial degree of turbulence. This nonturbulent condition of flow makes it possible to inject aerated water into the mixture so as to provide the required residence time for precipitation prior to mixing the air with the floc.

In FIG. 3, aerated water is obtained with tank 24 as provided in FIG. 1. The aerated water flows through conduit 25, is depressured through valve 26, and is injected into chamber 23. In conduit 23, the aerated water is injected so as to remain substantially isolated long enough to satisfactorily precipitate its air for flotation of the floc.

I have discovered that if the depressured aerated water is directed upward, along the axis of the chamber 23, it will not mix with the floc and water mixture for a finite length of time. The two streams of fluid, moving in the same direction, will preserve the isolation of the depressured aerated water very efficiently for the required time.

To create this flow of aerated water in a well-defined column 27 within the column of floc and water mixture flowing in chamber 23, the end of conduit 25 is turned upward as disclosed at 28 so the aerated water will discharge in the flow direction of the floc and water mixture.

The length of column 27 is desirably fixed by the time it takes the air in the water to satisfactorily precipitate. The rate of travel of the aerated water, and the pressure drop given to it across valve 26, are some of the factors which establish when the bubbles of air, of the correct size, have been formed and are ready to mix with the floc.

Eventually, turbulence will appear in both fluid streams within conduit 23. Turbulence will cause the streams to mix. However, it may be advantageous to positively stimulate mixing at the point in travel where the air bubbles are properly precipitated and sized. The mechanical means to bring about mixing is represented by a diverter body 28' which is positioned so the bubbles and floc will impinge on the surfaces of body 28' and be diverted into a mixing motion.

The diverter body 28' also spreads the mixture of floc and bubbles horizontally over the cross-section of tank 21. This diffusion promotes the even rise of the floc upward to form the body 29 with uniform dimension. This floc body can then be consistently removed by some mechanical structure not shown.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A method of separating solid material from liquid by flotation, including:
    forming a floc of the solid material in the liquid,
    flowing the mixture in a fixed path,
    depressurizing aerated water to precipitate the air in bubbles,
    providing isolation for the depressurized water while the air precipitates,
    mixing the air precipitated with the floc,
    withdrawing water from the mixture beneath the floc, and flotating the floc and air upward for removal from the mixture.

2. Apparatus for separating solid material from liquid by flotation, including:
    a first vessel connected to a supply of raw water contaminated with solid material and a supply of chemical which will form a floc in the water which will absorb and/or adhere to the solid material in the water, a first conduit connected to the first vessel to conduct the mixture of floc and water into a second vessel, a supply of aerated water, a second conduit connecting the supply of aerated water and the second vessel through which the aerated water flows into the second vessel, a means mounted in the second conduit for reducing the pressure of the aerated water, an arrangement and structure attached to the second conduit for receiving the aerated water and providing isolation of the depressured aerated water while the air precipitates, an arrangement and structure associated with the second conduit which provides mixing of the bubbles of precipitated water with the floc to enable the mixture to float to the upper portion of the second vessel, and means for withdrawing water from the lower portion of the second vessel.

3. The apparatus of claim 2 in which:

the arrangement and structure attached to the second conduit for receiving the aerated water is a circular chamber mounted with its discharge opening about the first conduit conducting the mixture of floc and water within the second vessel to discharge the precipitated air into the floc discharged from the first conduit into the second vessel.

4. The apparatus of claim 2 in which:

the arrangement and structure attached to the second conduit for receiving the aerated water is a section of the first conduit in which the depressured aerated water is discharged into and parallel with the flow of floc and water mixtures conducted into the second vessel so the air will precipitate as the depressured water flows in laminar relation to the mixture of floc and water for a finite distance.

5. A method of separating solid material from liquid by gaseous flotation, including:

flowing a liquid and solid material mixture in a fixed path, dissolving a gas under pressure in a liquid, depressuring the liquid containing the dissolved gas followed by flowing the liquid for a finite period in isolation in order to precipitate the gas in bubbles of very small size, and mixing the depressured liquid and gas with the liquid and solid material mixture, whereby the very small gas bubbles attach to the solid material and float toward the surface of the liquid for removal as a contaminate.

6. Apparatus for separating solid material from liquid by gaseous flotation, including:

a vessel connected to a supply of raw water contaminated with solid material, a supply of water under pressure in which a gas has been dissolved, an arrangement and connection between the supply and vessel with which the water is depressured and thereafter kept in isolation long enough for the dissolved gas to precipitate in very small bubbles, and an arrangement for mixing the depressured water and raw water so that the gas bubbles will attach to the solid material and float toward the surface of the raw water for removal.

References Cited

UNITED STATES PATENTS

| 2,772,234 | 11/1956 | Kelly | 210—44 |
| 3,117,082 | 1/1964 | Schluter | 210—221 |
| 3,179,252 | 4/1965 | Vrablik | 210—221 X |
| 3,243,046 | 3/1966 | Kakumoto et al. | 210—221 X |

FOREIGN PATENTS 952,532  3/1964  Great Britain.

REUBEN FRIEDMAN, *Primary Examiner.*

J. DE CESARE, *Assistant Examiner.*

U.S. Cl. X.R.

210—205, 221